United States Patent [19]
Knott

[11] 3,807,763
[45] Apr. 30, 1974

[54] HOUSE TRAILER FIFTH WHEEL HITCHING ARRANGEMENT

[76] Inventor: Edwin O. Knott, 1595 Laurelwood, No. 112, Santa Clara, Calif. 95059

[22] Filed: Aug. 30, 1972

[21] Appl. No.: 284,740

[52] U.S. Cl. ............................. 280/423 R, 280/495
[51] Int. Cl. ............................................ B62d 53/00
[58] Field of Search .............. 280/423, 495; 296/15

[56] References Cited
UNITED STATES PATENTS

| | | | |
|---|---|---|---|
| 3,722,917 | 3/1973 | Mims | 280/423 R |
| 3,425,740 | 2/1969 | Vaughn | 296/15 |
| 2,514,695 | 6/1950 | Dempsey | 296/15 X |

Primary Examiner—Leo Friaglia
Assistant Examiner—Randall A. Schrecengost
Attorney, Agent, or Firm—Moore, Zimmerman & Dubb

[57] ABSTRACT

A fifth wheel hitch is described for coupling a house trailer to an automobile for pulling. Such hitch includes a transverse beam which is designed to extend over the pulling vehicle above its rear axle, as a pair of spaced-apart legs which depend therefrom on opposite sides of the pulling vehicle. Each of the legs is secured adjacent its lower end to the frame of the pulling vehicle around its rear axle. A universal connector permitting movement between the pulling vehicle and the trailer is located generally at the mid-point of the transverse beam and is coupled to the underneath side of a cantilevered portion of the trailer to enable relative movement between the pulling vehicle and the trailer.

6 Claims, 4 Drawing Figures

PATENTED APR 30 1974  3,807,763
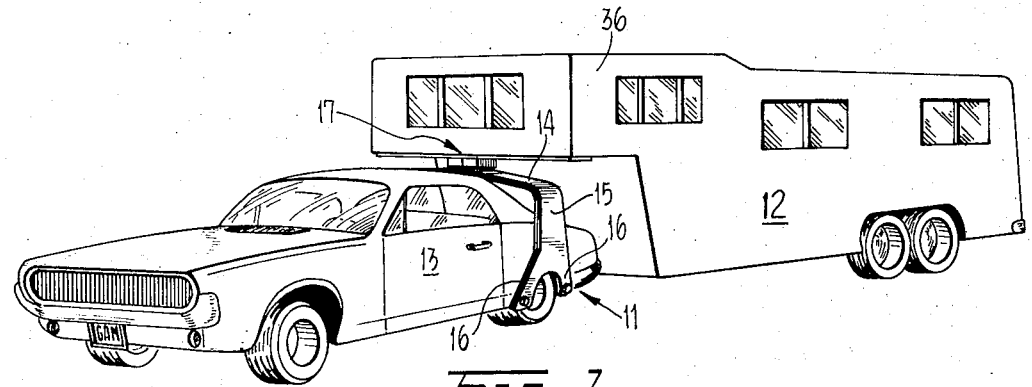
Fig_1
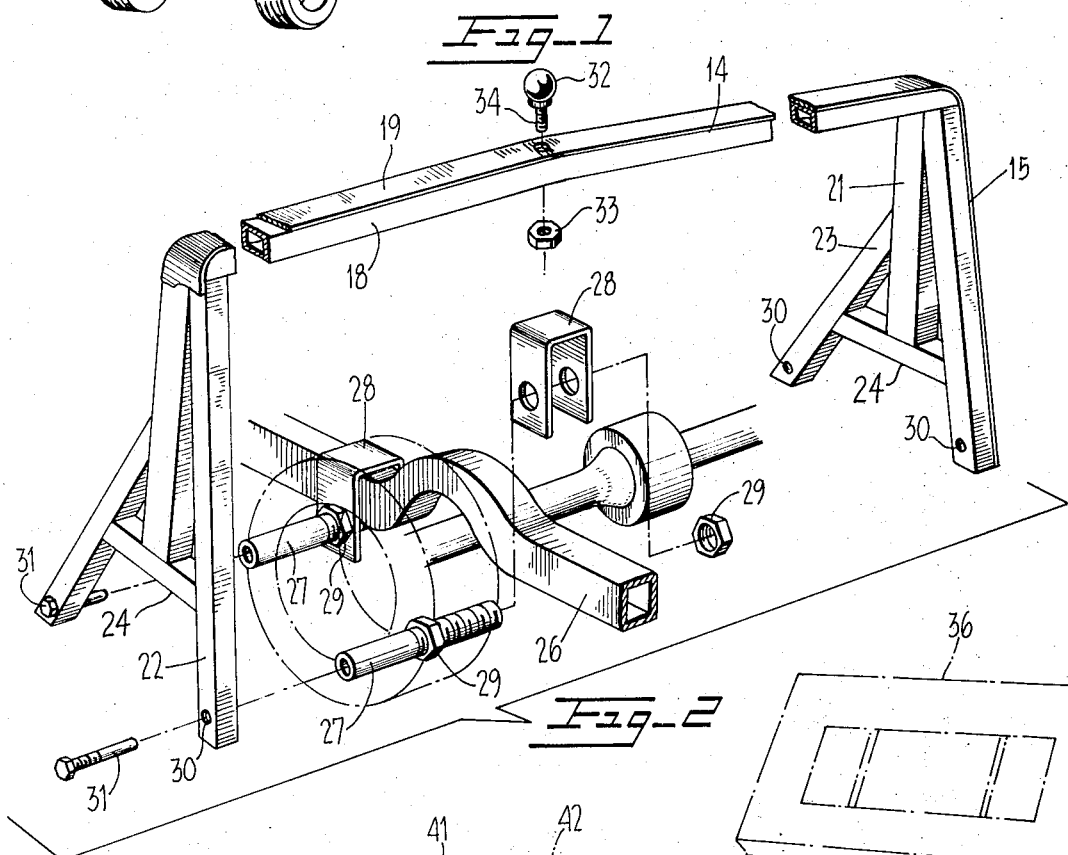
Fig_2
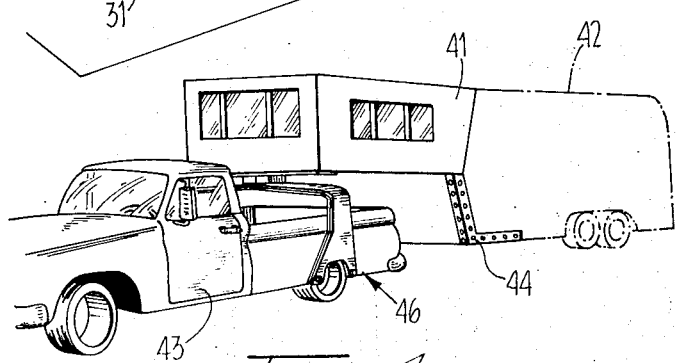
Fig_4
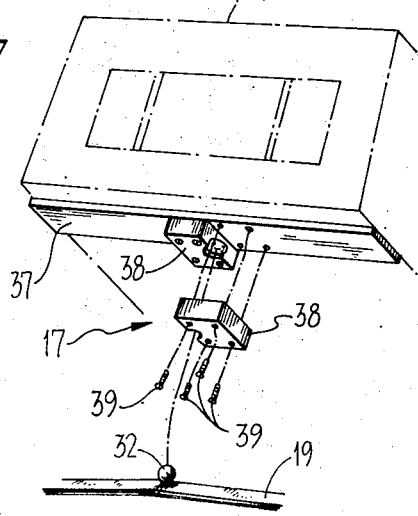
Fig_3

HOUSE TRAILER FIFTH WHEEL HITCHING ARRANGEMENT

BACKGROUND OF THE INVENTION

This invention relates to a fifth wheel hitching arrangement especially adapted for house trailers and, more particularly, to such a fifth wheel arrangement which enables an automobile to be used as a pulling vehicle, as well as permit a pick-up truck or the like to be used for such purposes without reducing the cargo space thereof.

Fifth wheel hitching arrangement, i.e., hitches in which the connection between the pulling vehicle and pulled vehicle is generally located over the rear axle of the pulling vehicle, have long been used by the trucking industry. Such arrangements are more stable and provide better tracking than hitches in which the vehicle coupling is located rearwardly of the pulling vehicle's rear wheels. More recently, house trailers, such as mobile homes and travel trailers, are being made available which are especially adapted for fifth wheel hitching arrangements. That is, house trailers are being built with an upper cantilevered portion extending forwardly of the front wall of the main compartment. The purpose of this cantilevered compartment is to not only provide more useable space within the trailer, but also to provide a trailer portion which extends or hangs over the rear wheels of the pulling vehicle for coupling to such vehicle at that location.

In general, house trailers adapted for fifth wheel coupling to a pulling vehicle utilize the fifth wheel hitching arrangement described in U.S. Pat. No. 3,392,992. This arrangement is designed for use with a pick-up truck or the like as the pulling vehicle. As disclosed within the patent, such hitch relies on the use of a cross beam and support structure located within the bed of the truck. It will be appreciated that the necessity of including such structure not only reduces the cargo space provided by the bed of the truck, but also limits the type of pulling vehicle that can be used, i.e., limits the use of the hitch to pick-up trucks or similar vehicles having an appropriate bed on which the support structure is mountable. This limitation on the type of vehicle which can be used has inhibited the wide adoption of fifth wheel coupling for house trailers, even though its advantages are well recognized. In this connection, it should be noted that many of the large passenger automobiles now available have the power and suspension required for pulling travel house trailers with fifth wheel coupling.

SUMMARY OF THE INVENTION

The present invention provides a fifth wheel hitching arrangement for house trailers which does not require that the pulling vehicle be a pick-up truck or otherwise have a bed on which the hitch can be mounted. More particularly, the hitch of the arrangement comprises a transverse beam having a pair of legs which depend downwardly therefrom, which legs are spaced apart an appropriate distance to enable reception therebetween of the body of a pulling vehicle. That is, the legs of the hitch extend downwardly along the side of the body of the pulling vehicle to adjacent opposite ends of the rear axle of such vehicle. Such legs are rigidly secured to the vehicle at such location to provide attachment of the hitch to the vehicle. The transverse beam has a coupling means located generally at its mid-point which is secured to the trailer to permit turning movement between the pulling vehicle and the trailer.

It will be appreciated that with this arrangement, the only rigid securance of the hitch to the vehicle is adjacent the bottom of the vehicle, such as to its frame, by the rear axle. Thus, none of the cargo space of the pulling vehicle is taken up by the hitch if the pulling vehicle is a pick-up truck. More importantly, the hitch of the invention enables the pulling vehicle to be an automobile. In this connection, it will be noted that the coupling point between the pulling vehicle and the trailer at which relative rotation is permitted, is spaced a substantial distance above the automobile's rear axle to permit unhindered rotation of the trailer over the rear portion of the automobile's body. It has been found that contrary to what one would expect, the coupling point can be located at such an upwardly spaced location from the axle, rather than closely above the axle as one typically finds in fifth wheel arrangements, without impairment of its functioning.

Most desirably, each of the legs which depends downwardly along the side of the pulling vehicle terminates in a pair of diverging arms which are separately secured to the vehicle at locations on opposite sides of the vehicle's rear axle. This provides a rigid, three-point type securance while at the same time enabling the rotational coupling point to be located directly above the pulling vehicle's rear axle as is desired.

The invention has other features and advantages which will become apparent from the following description of a preferred embodiment thereof.

BRIEF DESCRIPTION OF THE DRAWING

With reference to the accompanying single sheet of drawing:

FIG. 1 is a perspective view illustrating a house trailer secured to an automobile for pulling via a preferred enbodiment of the hitching arrangement of the invention;

FIG. 2 is a perspective, broken-away and partially exploded view of the hitching arrangement of FIG. 1, illustrating a portion of an automobile to show the manner in which the hitch is secured thereto;

FIG. 3 is a partial perspective, exploded view of the structure of the preferred embodiment for coupling the hitch to a trailer for turning movement; and FIG. 4 is a perspective view showing in phantom, a house trailer of the type designed to be pulled by an end hitch, which house trailer is secured to a pick-up truck by an alternate fifth wheel arrangement of the invention which includes a compartment for adapting the trailer for fifth wheel hitching.

DETAILED DESCRIPTION OF PREFERRED EMBODIMENTS

With reference to FIG. 1, a preferred embodiment of the hitching arrangement, generally referred to by the reference numeral 11, is illustrated coupling a typical fifth wheel trailer 12 to an automobile 13. As is illustrated, the hitch includes a tranverse beam 14 which extends laterally across the vehicle and has a pair of legs 15 (only one of which is shown in FIG. 1) depending therefrom. As can be seen, such legs are spaced apart a distance enabling reception therebetween of the body of automobile 13.

Means are also provided for rigidly securing each of the legs 15 to the automobile on opposite sides of its body. More particularly, each of the legs terminate in a pair of arms 16 which extend to locations forwardly and rearwardly of the rear axle of the automobile. Such arms are rigidly secured at such locations to the pulling vehicle in a manner to be discussed below.

The hitching arrangement of the invention further includes a coupling means in the form of an universal connector, generally referred to by the reference numeral 17, located at the midpoint of the transverse beam 14. As will become more apparent from the detailed description of such connector it permits horizontal rotation or, in other words, turning movement of the automobile with respect to the house trailer. Moreover, such connector is so designed that limited rotation of the automobile vertically about a transverse axis with respect to the house trailer is also permitted. That is, the coupling connector permits the automobile and the trailer to be at different angular orientations, as when the automobile starts up an incline or goes over the top of a hill. The connector also permits limited vertical rotation off the automobile with respect to the trailer around an axis which extends longitudinally of the automobile and trailer, i.e., roll. Thus, relative movement between the automobile and trailer caused by bumps or dips which affect opposite sides of the vehicles differently is also accommodated.

FIGS. 2 and 3 illustrate the detailed construction of the preferred embodiment of the hitch, including that of the coupling means. As shown, the main structural components of the hitch are generally comprised of tubular metal members so as to provide the hitch with an optimum strength-to-weight ratio. That is, the transverse beam is essentially made up of a tubular channel 18 over which is secured a light cosmetic skin 19 as of aluminum. Each of the legs 15 includes a central channel structural member 21 having its upper end rigidly secured, as by welding to a corresponding end of the channel 18. The rearwardly extending arm 16 of each of the legs is defined by another channel member 22 which is appropriately secured to the rear side panel of the channel 21 adjacent its upper end. As shown, the channel member 22 of each of the legs extends rearwardly of the hitch from its point of securance with the central channel 21.

The forward arm 16 of each of the legs is structurally defined by another tubular channel 23 which extends forwardly from its point of connection generally midway of the front side panel of the central channel 21. This lower point of connection is provided for the forward arm to enable the use of the hitch of the invention on all four door automobiles, some of which have doors whose opening would be blocked if the forward arm channel was secured adjacent the top of the central channel member in the same manner as is the rear channel member 22. A horizontal tie beam channel 24 is provided as a part of each of the legs securing the lower end of the channels 21, 22 and 23 together. To complete the legs 15, the cosmetic skin 19 is extended over such legs to provide the edge with the finished appearance illustrated in FIG. 1.

While various structural members of the hitch are shown as tubular members having a square cross-section, it will be appreciated that tubular members with a circular cross-section, i.e., pipe, can also be used to maximize the strength-to-weight ratio Also, in those instances in which weight is not of primary concern, solid members can be used for structural purposes.

The means for rigidly securing each of the legs to the vehicle body on opposite sides of its rear axle provides such securance to the frame of the automobile. To this end, the automobile main frame side rails on opposite sides of the vehicle, one of which side rails 26 is partially shown in FIG. 2, have tubular sleeves 27 secured on opposite sides of the rear axle, which sleeves extend laterally outward. More particularly, a pair of U-shaped straps 28 are positioned over each of the side rails on opposite sides of the rear axle. The ends of each of such straps terminate beyond the bottom of the side rail and are provided with registering apertures within which the tubular sleeve 27 associated therewith is secured via suitable threads and nuts 29.

Each of the sleeves 28 projects laterally outward of the automobile to a location slightly beyond the side panel of such automobile. The two sleeves on each side of the automobile are spaced apart a distance generally corresponding to the distance between the two hitch arms 16 to be secured thereto on such side of the automobile. A threaded bore 30 is provided through each of the arms in registration with the end of its associated sleeve 28. A bolt 31 is thus threadably receivable in its associated arm for extension into its corresponding sleeve 28.

It will be recognized that suitable blocks are placed within the ends of the tubular members 22 and 23 where the bores 30 are provided in order to strengthen the same at such locations and provide stock within which the desired threads can be made.

It will be appreciated that this provision of coacting bolts and sleeves on opposite sides of the automobile will result in each of the legs 15 and, hence the transverse beam 14, being rigidly secured to the automobile. This securance of the lower ends of each of the arms to opposite sides of the rear axle of the automobile can be said to result in a so-called "three-point" securance on such sides. That is, a triangular securance is obtained on each side of the automobile when one considers the rigid securance provided by the bolts in the two spaced arms and the securance against translation provided by the coupling means as will be described.

It will be seen that it is only necessary to thread four bolts to provide rigid securance of the hitch to the automobile and to provide unhitching as is desired. Thus, even though a structurally strong, three-point securance is provided on opposite sides of the automobile, the hitch may be easily attached or removed.

As long as the spacing between the outward ends of the sleeves 27 on opposite sides of the automobile is generally the same as the spacing between the legs 15, the desired rigid securance can be obtained without the necessity of threading the interior of the sleeves 27. That is, such sleeves will abut against the arms 16 on both sides of the vehicle to prevent lateral motion of the hitch with respect to such vehicle. This prevention of lateral movement of the hitch without the necessity of providing threads within the sleeves 27 is particularly desirable since the sleeves 27 often will be left on the automobile when the hitch is removed. Use of the automobile under conditions in which threads within such sleeves would otherwise be clogged need not be avoided.

The universal connector 17 providing coupling between the hitch and the trailer is simply a ball and cavity arrangement. For this purpose, a coupling ball 32 of the type commonly employed in hitches projects upwardly from generally the mid-point of the transverse beam 14. Such ball 32 is secured thereto as by a nut 33 received on a threaded shank 34 depending downwardly from the ball and extending through the beam 14.

Means defining a spherical cavity for reception of the ball is secured to the underneath side of the cantilevered portion 36 of the trailer. Specifically, as illustrated in FIG. 3, an anchor plate 37 is secured transversely of such underneath side between opposite sides of the trailer. The anchor plate has a pair of mating blocks 38 secured thereto as by bolts 39. As shown, each of the blocks 38 defines one-half of a spherical cavity within which the ball coupling 32 is received, thus together defining the cavity associated with the trailer receiving such ball.

It will be appreciated that with this ball and cavity coupling connector, horizontal rotation of that portion of the hitch rigidly secured to the automobile is permitted relative to that portion of such hitch rigidly secured to the trailer. Thus, the usual angular relationship of the automobile to the trailer which results from the automobile rounding a curve or turning a corner is permitted. Moreover, the ball-cavity coupling will permit limited rotation of the automobile with respect to the trailer in a vertical plane. More particularly, the bore into the cavity block through which the ball shank 34 entends is spaced from such shank to enable limited pivotal movement of such shank upon rotation of the ball around horizontal axes. Thus "pitch" and "side-roll" rotations of the automobile in vertical planes with respect to the trailer is allowed. In this connection, it should be noted that the transverse beam 14 slopes upwardly slightly from each of the legs 15 to the ball coupling 32. Thus, the outer ends of the transverse beam are vertically lower than its center to prevent the same from engaging the trailer and either causing damage or hindering desired side-roll of the automobile with respect to the trailer.

It will be appreciated that, as a practical matter, before a house trailer can be hitched to a pulling vehicle via a fifth wheel hitching arrangement, such trailer must include a cantilevered portion which is capable of extending over the vehicle for securance thereto of the hitch. FIG. 4 illustrates a hitching arrangement which is especially adapted to convert existing conventional end hitched trailers to a fifth wheel arrangement. More particularly, the hitch of the invention illustrated in FIG. 4 includes as part of the hitch, a separate living compartment 41 which is secured between a conventional trailer shown in phantom at 42, and pick-up truck 43 which represents the pulling vehicle. The separate living compartment 41 has a height substantially less than that of the trailer and is secured to the trailer in communication with the upper portion of the front wall of such trailer. To this end, angle iron edge straps 44 which depend downwardly from the compartment 41 are rigidly secured to the leading edge of the trailer 42. While not shown, it will be appreciated that additional securance between the compartment and the trailer is provided at all adjoining edges of the compartment and trailer. Moreover, the joints defined by such adjoining edges are suitably weather sealed.

Communication between the interior of the compartment 41 and the trailer is provided by making a suitable entry way through the front wall of the trailer into the compartment. Although the compartment 41 may be used for several different purposes, it is ideally suited for use as a sleeping compartment.

While the provision of the compartment 41 to provide a cantilevered or overhanging portion to the trailer 42 will enable the use of various types of fifth wheel arrangements with a pulling vehicle, most desirably the fifth wheel arrangement, referred to by the reference numeral 46, is the same as that described earlier. Thus, the utilization of such compartment as part of the fifth wheel arrangement will convert existing trailers designed for conventional pulling hitches into fifth wheel arrangements which can be pulled by either a pick-up truck or an automobile.

From the above description of preferred embodiments, it will be seen that the invention provides the desired arrangement enabling either an automobile or a truck to be used to pull a house trailer with fifth wheel coupling. Moreover, it will be recognized that if a truck is used as the pulling vehicle, the fifth wheel arrangement does not limit the bed cargo space of the truck as does prior arrangements.

Various changes and modifications can be made in the invention without departing from the spirit of the invention. It is therefore intended that the coverage be limited only by the claims and their equivalents.

I claim:

1. A house trailer fifth wheel hitching arrangement comprising a transverse beam having a pair of legs depending therefrom which are spaced apart a distance enabling reception therebetween of the body of a pulling vehicle adjacent the rear axle thereof, means for rigidly securing each of said legs to said pulling vehicle on opposite sides of said body, and means at generally the midpoint of said transverse beam for coupling the same to the underneath side of a cantilevered portion of a house trailer in a manner enabling horizontal rotation relative to said house trailer of said beam and hence of a pulling vehicle secured to said hitching arrangement; each of said legs terminating at its lower end in a pair of arms which extend adjacent the body of said pulling vehicle to locations on opposite sides of the rear axle thereof; and said means for rigidly securing each of said legs to said pulling vehicle including for each of said arms, a bolt threadably receivable in its associated arm and extendable into a correspondingly registering sleeve carried by and projecting outwardly from the frame of said vehicle toward said arm.

2. A house trailer fifth wheel hitching arrangement comprising a transverse beam having a pair of legs depending therefrom which are spaced apart a distance enabling reception therebetween of the body of a pulling vehicle adjacent the rear axle thereof, means for rigidly securing each of said legs to said pulling vehicle on opposite sides of said body, and means at generally the midpoint of said transverse beam for coupling the same to the underneath side of a cantilevered portion of a house trailer in a manner enabling horizontal rotation relative to said house trailer of said beam and hence of a pulling vehicle vehicle secured to said hitching arrangement; said means coupling said transverse beam to said underneath side of said cantilevered portion being a universal motion connector enabling limited rotation of said beam relative to said house trailer in vertical planes: and each of said legs terminating at its lower end in a pair of separated arms which extend adjacent the body of said pulling vehicle to locations on opposite sides of the rear axle thereof, and said means for rigidly securing each of said legs to said pulling vehicle including for each of said arms, a bolt threadably receivable in its associated arm and extendable into a correspondingly registering sleeve carried by and projecting outwardly from said frame of said vehicle towards said arm.

3. The house trailer fifth wheel hitching arrangement of claim 2 wherein said transverse beam and said pair of legs are generally comprised of tubular metal members providing the same with strength at a minimum of weight.

4. The house trailer fifth wheel hitching arrangement of claim 6 wherein said cantilevered portion of said house trailer is a part of said hitching arrangement and is a separate living compartment having a height dimension which is substantially less than that of a house trailer, and means are provided for rigidly securing said separate compartment to said house trailer in communication with the upper portion of the front wall of said trailer to provide the same with said cantilevered portion for fifth wheel coupling.

5. A house trailer fifth wheel hitching arrangement comprising a separate living compartment having a height dimension substantially less than that of a house trailer, means for rigidly securing said separate compartment to said house trailer in communication with the upper portion of the front wall of said trailer to provide said trailer with a cantilevered portion extending forwardly of said trailer front wall, and a coupling secured to the underneath side of said cantilevered portion at a location for hitching said cantilevered portion and, hence, said trailer rigidly seucred therewith over the rear wheels of a pulling vehicle.

6. The house trailer fifth wheel hitching arrangement of claim 5 wherein said coupling further includes a transverse beam having a pair of legs depending therefrom which are spaced apart a distance enabling reception therebetween of the body of a pulling vehicle adjacent the rear axle thereof, means for rigidly securing each of said legs to said pulling vehicle on opposite sides of said body, and means at generally the midpoint of said transverse beam for coupling the same to said underneath side of said cantilevered portion of said house trailer in a manner enabling horizontal rotation relative to said house trailer of said beam and hence of a pulling vehicle secured to said hitching arrangement.

* * * * *